Patented Jan. 17, 1933

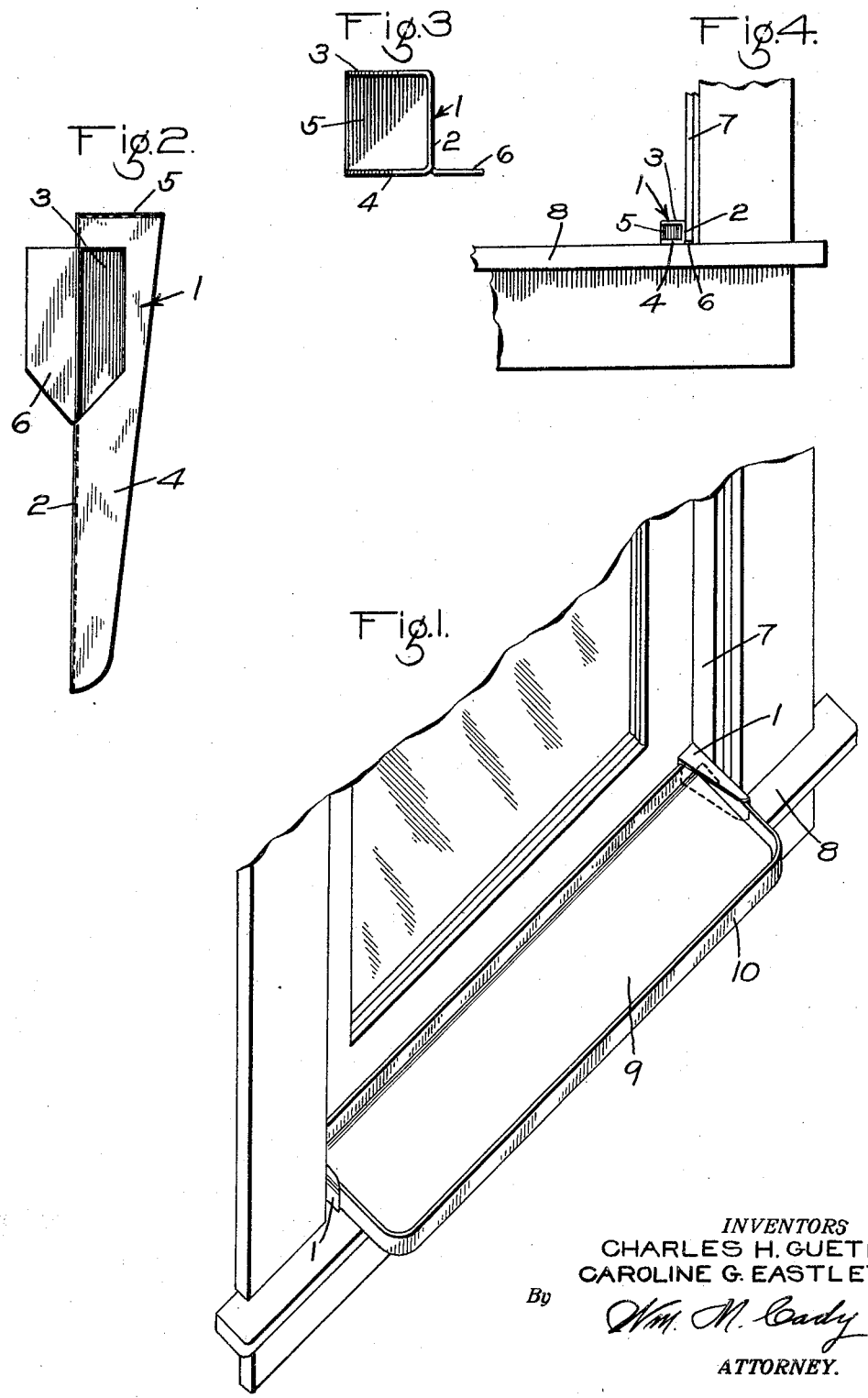

1,894,310

UNITED STATES PATENT OFFICE

CHARLES H. GUETH, OF EAST McKEESPORT, AND CAROLINE G. EASTLEY, OF PITTSBURGH, PENNSYLVANIA

WINDOW GARDEN SHELF

Application filed January 22, 1932. Serial No. 588,104.

This invention relates to a shelf or tray adapted to be mounted on a window sill for supporting potted plants, flowers and the like.

The principal object of our invention is to provide an improved bracket support for a shelf or tray of the above character, which is simple in construction, cheap to manufacture, and very easy to apply in position.

In the accompanying drawing; Fig. 1 is an isometric view of a portion of a window framing, showing our improved bracket and tray mounted on the window sill; Fig. 2 an inverted plan view of one of the tray supporting brackets; Fig. 3 an end view of the bracket; and Fig. 4 a face view of a portion of the window framing, showing the bracket applied thereto.

According to our invention, brackets are employed for supporting the tray on the window sill. The brackets are formed of sheet metal and as shown in Fig. 2, each bracket 1 is bent or shaped so as to form a back 2, parallel top and bottom flanges 3 and 4, and an end portion 5. Preferably punched out of the bottom flange 4 is a wing 6, which is turned back so as to lie in line with the bottom flange 4.

In order that the brackets may be applied at the right and left hand sides of the window, they are made as pairs, with one bracket having its wing 6 extending to the right and the other to the left.

The brackets are applied by forcing the wing 6 between the usual weather strip member 7 and the sill 8 of the window, as shown in Fig. 4. If there is not sufficient clearance between the strip 7 and the sill 8 to permit the driving of the wing 6 into position, the strip 7 may be slightly wedged up, so as to provide the desired space.

After the brackets have been positioned at the right and left hand sides of the window, a tray or shelf 9 is inserted in the receiving channels formed in the brackets, as shown in Fig. 1.

The tray 9 is provided with a peripheral flange 10, the sides of which are of such height as to readily enter into the channels of the brackets.

The brackets are simple in construction and thus can be very cheaply manufactured, and the brackets are readily positioned without the use of nails, screws or other fastening means, to provide a rigid support for the tray.

It will be evident that the tray may be readily slid into and out of position at will.

The tray and the brackets may be painted or lacquered and sold as an assembly of a pair of brackets and the tray.

Having now described our invention, what we claim as new and desire to secure by Letters Patent, is:—

1. A bracket for supporting a window tray formed of sheet metal to provide a channel for receiving the tray and having a wing adapted to be inserted between the window sill and a vertical weather strip.

2. A bracket for supporting a window tray formed of sheet metal to provide a channel for receiving the tray and a rear end portion forming a stop for the tray, said bracket being provided with a wing adapted to be inserted between the window sill and an upstanding portion of the window framing.

3. The combination with a window tray, of a pair of supporting brackets for receiving said tray, each bracket having an integral wing adapted to be inserted between the window sill and an upstanding member of the window frame, to secure said brackets in position.

4. A one piece sheet metal bracket for supporting a window tray formed to provide a back, and top and bottom flanges between which said tray is adapted to slide, and a wing adapted to be inserted between the window sill and an upstanding member of the window framing to secure the bracket in position.

5. A one piece sheet metal bracket for supporting a window tray formed to provide a back, and top and bottom flanges between which said tray is adapted to slide, and a wing positioned in the plane of the bottom flange and adapted to be inserted between the window sill and an upstanding portion of the window framing to secure the bracket in position.

In testimony whereof we have hereunto set our hands, this 20th day of January, 1932.

CHARLES H. GUETH.
CAROLINE G. EASTLEY.